Sept. 20, 1932.  H. T. LAMBERT  1,878,411
TIRE DEFLATION SIGNAL
Filed Oct. 5, 1931
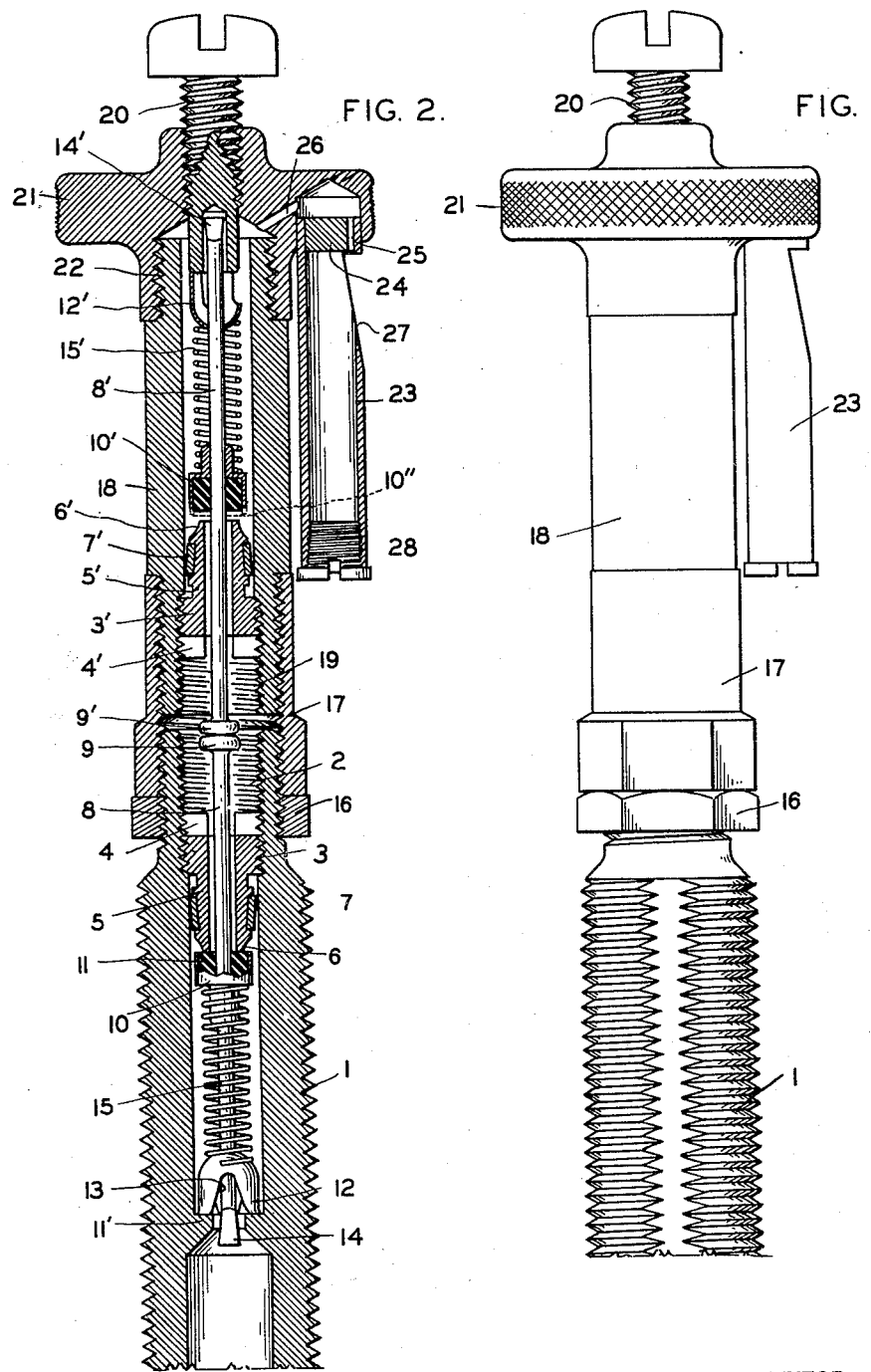
INVENTOR
HOWARD T. LAMBERT
BY
ATTORNEY Patented Sept. 20, 1932

1,878,411

UNITED STATES PATENT OFFICE

HOWARD T. LAMBERT, OF JOHNSTOWN, PENNSYLVANIA; IRA GILBERT LAMBERT, EXECUTOR OF SAID HOWARD T. LAMBERT, DECEASED

TIRE DEFLATION SIGNAL

Application filed October 5, 1931. Serial No. 566,830.

This invention relates to tire deflation signals and more particularly to an audible deflation signal combined with the check valve of the inner tube.

The principal object of the invention is to operate the signal when the tire becomes underinflated.

Another object is to discontinue the operation of the signal after a predetermined interval to prevent the complete deflation of the tire.

Another object is to provide means for the adjustment of the signal to operation at varying pressures.

A further object is to minimize the cost of production of the signal by utilizing a pair of conventional tire check valves for operating the signal.

Other objects and advantages appear as the description progresses.

In the specification and the accompanying drawing the invention is disclosed in its preferred form. It is to be understood, however, that it is not limited to this form because it may be embodied in other forms without departing from the spirit of the invention as defined in the claims following the description.

In the accompanying one sheet of drawing:

Fig. 1 is a side elevation view of a tire deflation signal constructed in accordance with this invention.

Fig. 2 is a vertical section of the same.

In detail the construction illustrated in the drawing, referring more particularly to Fig. 2, the tubular valve stem 1 has its lower end fixed in the conventional inner tube in the usual manner. The upper end of the valve stem is internally threaded at 2 for a short distance to receive the hollow bushing 3. The bushing is provided with two upstanding lugs 4 which are adapted to be engaged by a suitable tool for screwing in the bushing until it seats at the lower end of the thread 2.

The neck 5 of the bushing extends downwardly therefrom and terminates in the annular valve seat 6. The resilient baffle 7 snugly engages the neck 5 and impinges on the walls of the central opening of the valve stem to divert the full air pressure of the tire from the threads of the bushing 3.

The valve plunger 8 extends through the hollow bushing 3 and has the enlarged head 9 at its upper end to prevent the plunger falling through the bushing 3 when the valve assembly is removed from the stem 1. The valve 10 is fixed on the plunger 8 and has the resilient washer 11 adapted to cooperate with the valve seat 6.

The rosette guide 12 rests on the annular shoulder 11 formed in the central passage of the stem 1 and has the interspaced openings 13 to permit the escape of air therethrough. The lower end of the valve plunger passes through this guide and is enlarged by being flattened at 14 to hold the guide in place when the valve assembly is removed.

The spring 15 encircles the valve plunger and expands between the guide 12 and the valve 10 to urge the valve upward into engagement with the seat 6. The air pressure of the tire working against the back of the valve assists the spring 15 in maintaining the valve normally seated.

To inflate the tire, compressed air is applied to the upper end of the central opening of the valve stem. The pressure of this air overcomes the tension of the spring 15 and unseats the valve 10. Air then flows through the bushing 3, past the valve 10 and through the openings in the guide 12 into the inner tube, thus inflating the tire.

When it is desired to deflate the tire, the plunger 8 is manually pressed downward to unseat the valve 10, permitting the air to escape.

The construction just described is the conventional air check valve sold under the trade name of "Schrader". The details of this construction will vary with other makes but with all of which the present invention may be combined by modifications obvious to those skilled in the art.

The upper end of the stem 1 is, as usual, reduced in diameter and threaded to receive the conventional valve cap. To apply this invention to the tire, the valve cap is removed and the adjustable lock nut 16 and internally threaded bushing 17 are screwed on the valve stem. The lower end of the bushing 17 is formed into a hexagon to facilitate screwing it on the end of the valve stem.

The tubular body 18 has its lower end reduced in diameter and threaded to enter the bushing 17. The interior of the body 18 is internally threaded at 19 at its lower end for a limited distance.

A second valve assembly similar to the "Schrader" valve previously described has the bushing 3' with the depending lugs 4' and screwed into the threads 19 until the bushing seats at the end of the thread. The neck 5' has the baffle 7' thereon and terminates in the annular valve seat 6'.

The valve 10' is fixed on the plunger 8' and is adapted to cooperate with the valve seat 6'. The spring 15' encircles the plunger 8' and expands between the valve 10' and the rosette guide 12' urging the valve downward toward its seat and forcing the guide upward against the lower end of the screw 20. This screw is threaded through the center of the flanged cap 21 which is internally threaded at 22 to engage the threaded upper end of the body 18. The lower end of the screw 20 is centrally bored to pass the end 14' of the plunger 8'.

The pipe whistle 23 is fixed in the lower side of the flanged cap 21 and depends therefrom parallel with the body 18. The upper end of the whistle is closed by the plug 24 having the peripheral slot 25 therein. This slot communicates with the interior of the tubular body 18 through the passage 26 and is adapted to direct a blast of escaping air against the sharpened bevel edge 27 cut in the side of the tube 23. This produces an audible whistling signal of sufficient volume to be heard by the operator of the vehicle upon which it is used. The whistle 23 must be of fairly accurate manufacture to enable it to operate with a wide range of air pressures.

The lower end of the tube 23 is closed by the plug screw 28 threaded therein. This screw can be periodically removed to clean accumulations of mud and dust from the whistle.

The lower end of the plunger 8' is provided with the enlarged head 9' which is adapted to impinge on the head 9, causing the plungers 8—8' to operate as a unit.

When the tire is inflated to its correct pressure, the air pressure of the tire, impinging on the valve 8, maintains the valve seated against the tension of the spring 15' which exerts a downward pressure on the plunger 8 tending to unseat the valve 10. This prevents the spring 15' from lowering the plunger 8' sufficient to close the valve 10'. Thus this valve remains open as shown in Fig. 2.

When the tire becomes underinflated to a few pounds under its correct pressure, the tension of the spring 15' counterbalances the tension of the spring 15 and the compressed air within the tire. This unseats the valve 10 and moves the valve 10' nearer its seat 6' but does not completely close it. To accomplish this closing the spring 15' should be stronger than the spring 15 to enable it to exert a pressure equal to the tension of the spring 15, plus the pressure of the compressed air in the tire.

The exact point at which the spring 15' counter-balances the combined tension of the spring 15 and the air pressure of the tire, can be regulated by adjusting the screw 20 to vary the tension of the spring 15'. Thus, the device can be adjusted to operate when the pressure in the tire falls to any predetermined poundage.

When the valve 10 is unseated by the counterbalancing of the springs 15'—15, due to the loss of air pressure in the tire, a small quantity of compressed air escapes past the valves 10—10' and flows up the body 18 and through the restricted slot 25 to operate the whistle 23.

After the whistle has been operating for some time, the escaping air still further diminishes the air pressure in the tire. This reduces the pressure exerted against the back of the valve 10. The spring 15' then completely overcomes the resistance of the spring 15 and closes the valve 10' preventing further escape of air and discontinuing the operation of the audible signal 23. This allows sufficient air pressure to remain in the tire to prevent complete deflation.

By adjusting the bushing 17 and the lock nut 16 on the neck of the valve stem 10, the distance between the two valve assemblies can be regulated to vary the displacement of the valve 10', as shown in dotted lines 10'', when the tire is inflated to the correct pressure. This regulates the interval of time required for the valve 10' to seat under the constant gradual expansion of the spring 15' when the signal is operating, and consequently determines the air pressure left in the tire after the signal has ceased operating. Thus the device may be accurately adjusted to discontinue its operation when the air pressure of the tire falls to any desired poundage. When the lock nut is once properly adjusted on the neck of the valve 1, the bushing 17 may be removed and replaced without affecting the adjustment of the lock nut.

Having thus described this invention, what I claim and desire to secure by Letters Patent is:

1. A tire deflation signal comprising signal means, a valve adapted to release air from the tire to operate said signal means, means to open said valve when the air in the tire falls below a predetermined pressure, and means to close said valve when the air pressure of the tire is further reduced.

2. A deflation signal for pneumatic tires having a check valve comprising an audible signal operable by the release of air by said check valve, and resilient means adapted to open said check valve when the air in the tire falls below a predetermined pressure, and means to discontinue the escape of air when the pressure of the tire is further reduced.

3. A deflation signal for pneumatic tires comprising a check valve, an audible signal operable by the release of air from the tire by said check valve when the air in the tire falls below a predetermined pressure, and a second valve interposed between said check valve and said signal and adapted to close when the air pressure in the tire is further reduced.

4. A tire deflation signal comprising a check valve closing said tire, an audible signal operated by the release of air by said check valve, a second valve interposed between said check valve and said signal, and resilient means adapted to open said check valve when the air in the tire falls below a predetermined pressure and adapted to close said second valve when the air pressure is further reduced.

5. A tire deflation signal comprising a hollow stem fixed to said tire, a pair of conventional tire valves oppositely disposed to each other in said stem, one of said valves acting as a check valve to close said tire, plungers fixed in said valves adapted to impinge against each other, resilient means cooperating with one of said valves and adapted to open said check valve when the air in the tire falls below a predetermined pressure and adapted to close the other valve when the air pressure is further reduced, and an audible signal fixed on the end of said stem and operable by the release of air therefrom.

In testimony whereof I have hereunto set my hand this 25th day of September, 1931.

HOWARD T. LAMBERT.